United States Patent [19]
Palamara et al.

[11] Patent Number: 5,963,866
[45] Date of Patent: Oct. 5, 1999

[54] WIRELESS LOCATION MESSAGING

[75] Inventors: Maria E. Palamara, Denville; Robert Ellis Richton, Madison, both of N.J.

[73] Assignee: Lucent Technologies Inc., Murray Hill, N.J.

[21] Appl. No.: 08/784,108

[22] Filed: Jan. 15, 1997

[51] Int. Cl.$^6$ .................................................. H04B 7/005
[52] U.S. Cl. .......................... 455/456; 342/450; 342/457
[58] Field of Search .................................. 455/67.6, 456, 455/457; 342/450, 457

[56] References Cited

U.S. PATENT DOCUMENTS

| | | | |
|---|---|---|---|
| 5,625,668 | 4/1997 | Loomis et al. | 455/456 |
| 5,627,877 | 5/1997 | Penttonen | 455/456 |
| 5,736,964 | 4/1998 | Ghosh et al. | 455/456 |
| 5,740,538 | 4/1998 | Joice et al. | 455/456 |
| 5,758,288 | 5/1998 | Dunn et al. | 455/456 |

*Primary Examiner*—Wellington Chin
*Assistant Examiner*—Congvan Tran
*Attorney, Agent, or Firm*—Jimmy Goo

[57] ABSTRACT

The present invention is a wireless location messaging system and method for determining the location of a mobile-telephone in a home or roaming wireless communication system, and in a multitude of call states using an audit signal and a confirmation signal that provides enhanced location accuracy. In one embodiment, the present invention wireless location messaging system is implemented in a wireless communication system comprising a base station for transmitting an audit signal, receiving a confirmation signal transmitted by a mobile-telephone in response to the audit signal and time stamping when the confirmation signal was received, and a location system for determining a location of the mobile-telephone using the receive times of the confirmation signal. The audit signal and the confirmation signal are transmitted using a communication channel that depends on the current call state of the mobile-telephone. Another embodiment of the present invention includes a location register that indicates the wireless communication system last known to serve the particular mobile-telephone. If a second wireless communication system was last known to the serve the particular mobile-telephone, the second wireless communication system is cause to transmit the audit signal, receive the confirmation signal, and time stamp the confirmation signal using its base stations. Subsequently, these receive times are used to determine the location of the particular mobile-telephone.

28 Claims, 7 Drawing Sheets

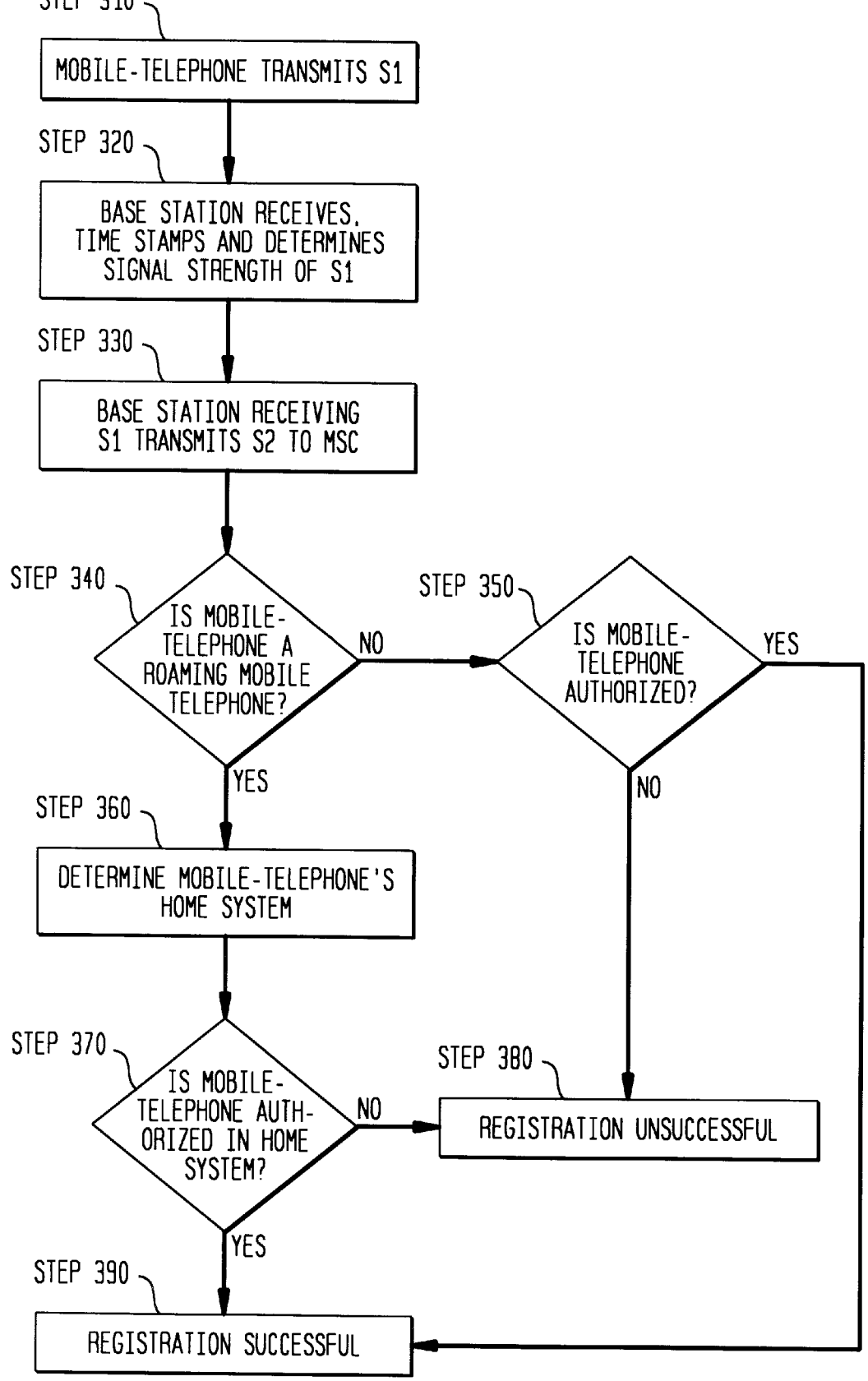

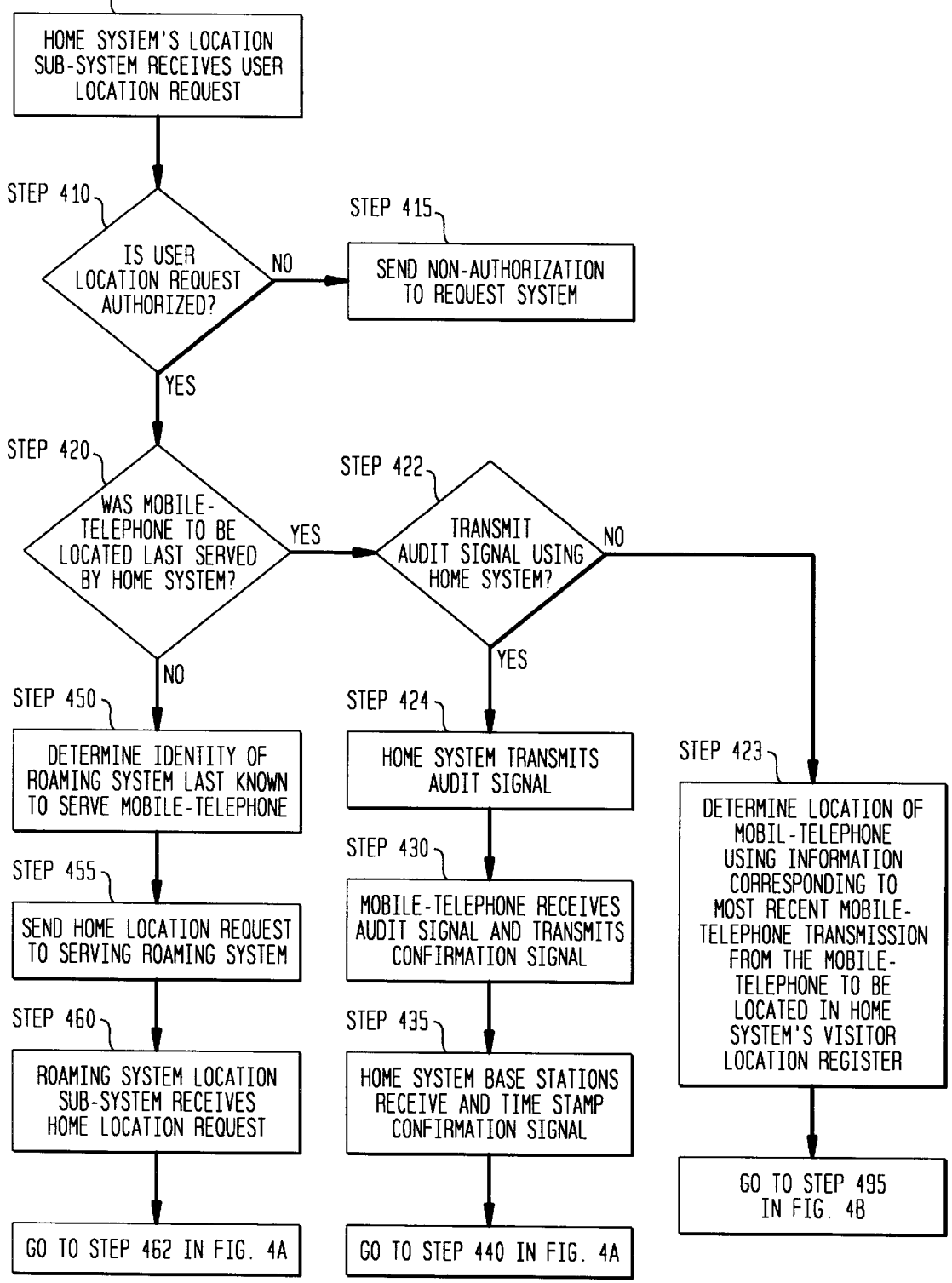

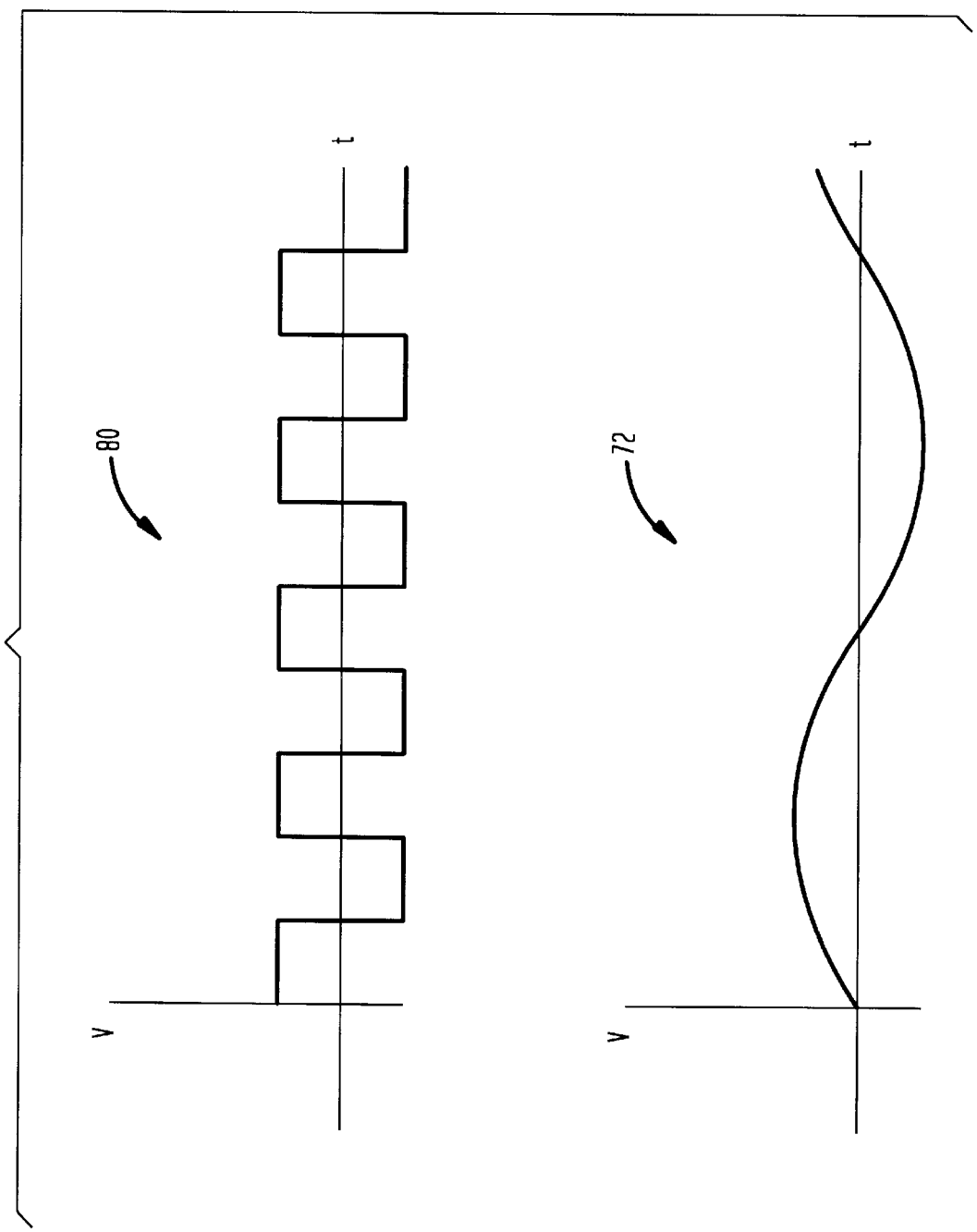

WIRELESS LOCATION MESSAGING

FIELD OF THE INVENTION

The present invention relates generally to wireless communication systems and, in particular, to systems for locating mobile-telephones.

BACKGROUND OF THE RELATED ART

Since the introduction of 800 MHz band cellular communications in the early 1980's, wireless communication service has grown rapidly. During this same period, Enhanced 9-1-1 (E911) has proliferated the U.S. wired communication system, thereby providing accurate location of 9-1-1 wired callers, among other things, such as routing 9-1-1 calls to appropriate emergency dispatch centers. To provide a level of service comparable to E911 in wireless communication system, location systems have been developed to locate mobile-telephones. However, prior art location systems are deficient for a number of reasons.

First, the prior art location systems typically exist independently of the wireless communication systems, i.e., non-integrated with the wireless communication systems, thereby increasing the cost of location systems although some of the equipment and information used and collected by the location systems and the wireless communication systems are the same.

Second, the prior art location systems can only locate mobile-telephones within the geographical area covered by the location system. Thus, if the mobile-telephone is not within the coverage area of the location system, or if the person desiring to locate the mobile-telephone does not know the general area or identity of the location system in which the mobile-telephone is located, then the mobile-telephone cannot be located.

Third, the prior art location systems typically monitors overhead channels for transmissions containing 9-1-1 phone numbers or some other predetermined phone number or sequence of characters. Because of prohibitively high costs, the prior art location systems do not monitor voice channels. Consequently, the capability of the prior art systems are limited, e.g., cannot locate mobile-telephones that are idle or engaged in a conversation.

Accordingly, there exist a need for an inexpensive location system that is integrated into a wireless communication system and is operable to locate mobile-telephones within the geographical area covered by the current location system or another location system. There further exist a need for a location system that can locate a mobile-telephone in a multitude of call states.

SUMMARY OF THE INVENTION

The present invention is a wireless location messaging system and method for determining the location of a mobile-telephone in a home or roaming wireless communication system, and in a multitude of call states using an audit signal and a confirmation signal that provides enhanced location accuracy. In one embodiment, the present invention wireless location messaging system is implemented in a wireless communication system comprising a plurality of base stations and a location system. Each of the base stations includes a transmitter for transmitting an audit signal, which is a signal that indicates to a mobile-telephone of interest to respond by transmitting a confirmation signal, a receiver for receiving the confirmation signal transmitted from the mobile-telephone of interest, and a time indicator for recording a time when the confirmation signal is received by that base station. The location system includes a location process for determining the location of the mobile-telephone of interest using the receive times of the confirmation signal at one or more base stations.

In operation, one or more base stations transmits the audit signal, which is received by the mobile-telephone of interest. The communication channel by which the audit signal is transmitted will depend on the call state of the mobile-telephone of interest. If the mobile-telephone of interest is in an idle call state, the audit signal is transmitted via a set-up overhead channel. By contrast, if the mobile-telephone of interest is in a conversation call state, the audit signal is transmitted via a voice overhead channel that is associated with a voice channel assigned to the mobile-telephone of interest while in the conversation call state. Upon receipt of the audit signal, the mobile-telephone of interest responds by transmitting the confirmation signal, in one embodiment, via the same communication channel in which the audit signal was transmitted. Upon receipt and time stamping of the confirmation signal by one or more base stations, the location system uses the receive times to determine the location of the mobile-telephone of interest. Advantageously, in one embodiment, the confirmation signal is a broadband digital signal with a predictable waveform that enables easier detection of the confirmation signal by the base stations, thereby enhancing the accuracy of the receive times and the location of the mobile-telephone of interest.

In another embodiment, the wireless communication system of the present invention further comprises a database containing indications of mobile-telephones, such as a mobile-telephone identification number, and indications of wireless communication systems last known to serve the mobile-telephones. To locate the mobile-telephone of interest, the location system uses the database to determine the wireless communication system last known to serve the mobile-telephone of interest. If the current wireless communication system was last known to serve the mobile-telephone of interest, the audit signal is transmitted by one or more base stations in the current wireless communication system. If a second wireless communication system was last known to serve the mobile-telephone of interest, the audit signal is transmitted by one or more base stations in the second wireless communication system. In the latter scenario, the mobile-telephone of interest responds by transmitting the confirmation signal, which is received and time stamped by one or more base stations in the second wireless communication system. Subsequently, the location system of the first wireless communication system or a location system in the second wireless communication system determines the location of the mobile-telephone of interest using the receive times of the confirmation signal recorded by the base stations of the second wireless communication system.

BRIEF DESCRIPTION OF THE DRAWINGS

The features, aspects, and advantages of the present invention will become better understood with regard to the following description, appended claims, and accompanying drawings where:

FIG. 3 depicts a flowchart illustrating the manner in which a mobile-telephone autonomously registers with the wireless communication system;

FIGS. 4, 4a, 4b depict a flowchart illustrating the manner in which one embodiment of the present invention locates a mobile-telephone that is idle or engaged in a conversation; and FIG. 5 depicts an example of a confirmation signal that enhances the accuracy of the present invention.

DETAILED DESCRIPTION

Figure 1:
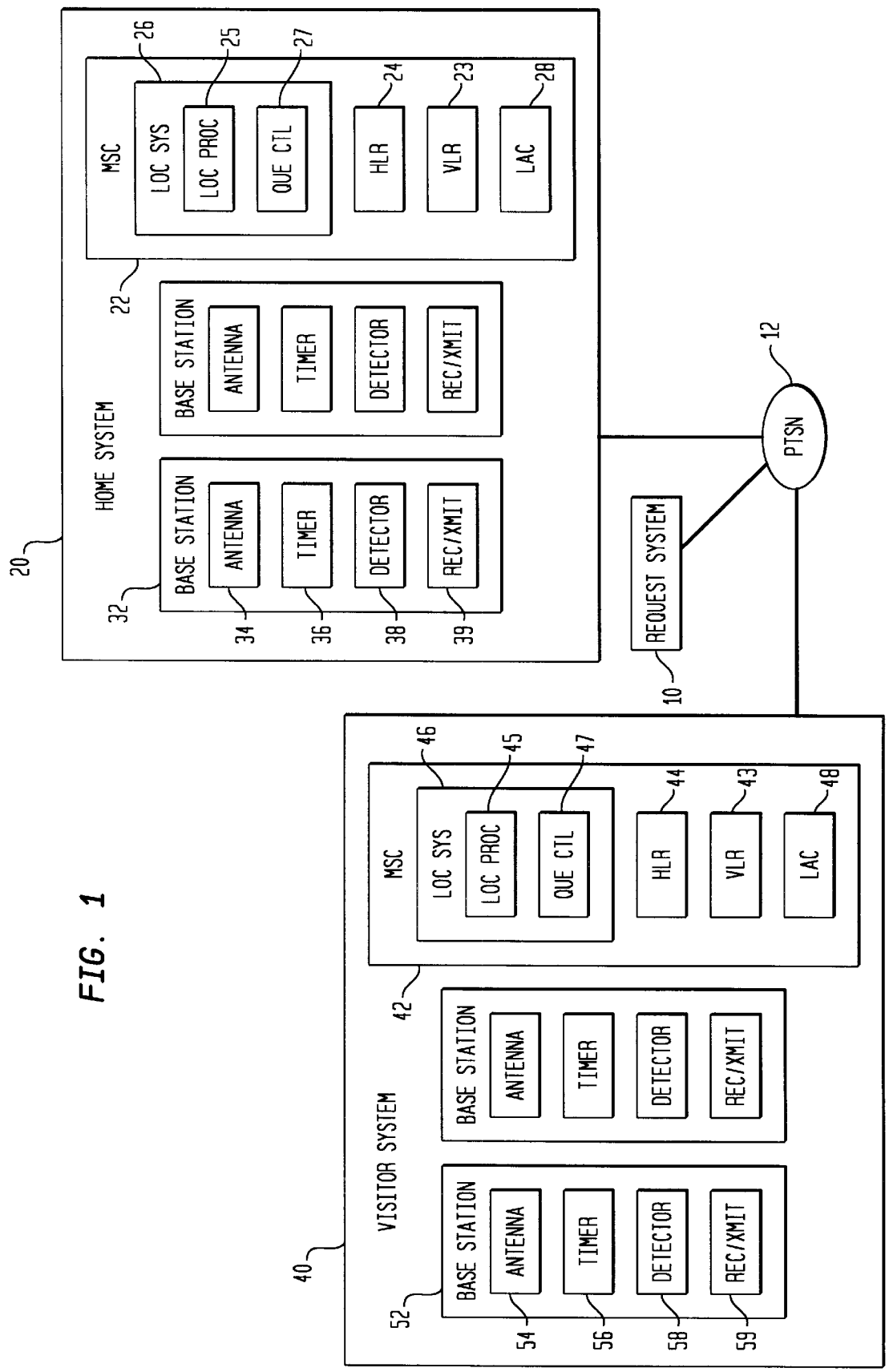
FIG. 1 depicts an illustrative block diagram of wireless communication systems used in accordance with one embodiment of the present invention.

Referring to FIG. 1, there is shown an illustrative block diagram of wireless communication systems used in accordance with one embodiment of the present invention. As shown in FIG. 1, wireless communication systems 20,40 and a Request System 10 are connected via a Public Telephone Switching Network 12, wherein the Request System 10 is a system for allowing users to subscribe to the wireless communication systems to locate mobile-telephones. In one embodiment, the wireless communication system 20 is a "Home System" and the wireless communication system 40 is a "Roaming System." The Home System 20 is defined as the wireless communication system to which a mobile-telephone belongs, whereas the Roaming System 40 is defined as any wireless communication system that is not the Home System of a mobile-telephone—in other words, whether a wireless communication system is a Home System or a Roaming System depends on the individual mobile-telephone's relationship with the wireless communication system. For purposes of this application, the term mobile-telephone should be construed to include all wireless communication devices.

Figure 2:
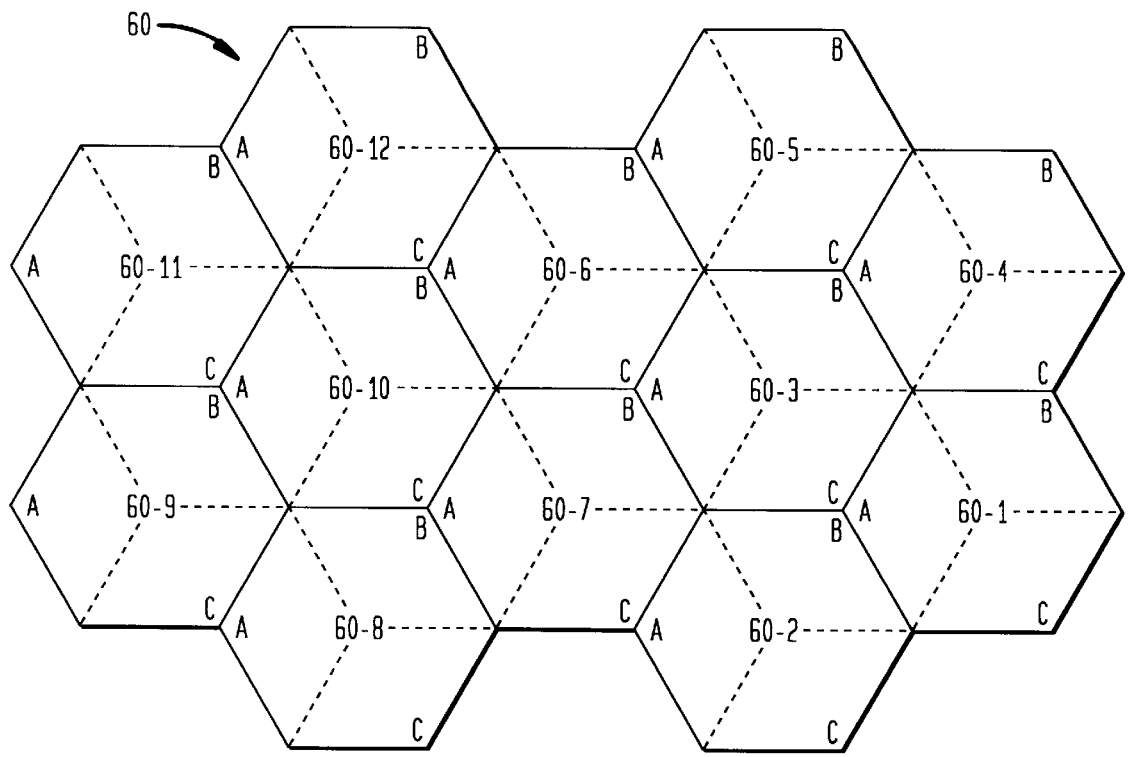
FIG. 2 depicts an illustration of a possible partition of a geographical area covered by a wireless communication system.

Each wireless communication system provides wireless communication services to a particular geographical area using radio channels, which are divided into communication channels. The communication channels include: set-up overhead channels, which are communication channels dedicated to call set-up including paging and registration services; voice channels, which are communication channels for transmitting voice, data, fax, video, etc.; and voice overhead channels, which are communication channels associated with one or more voice channels and used for signaling purposes during voice, data, fax, video, etc. communication. In one embodiment, broadband digital signals are transmitted via the set-up overhead channels and voice overhead channels, and analog signals are transmitted via the voice channels. The geographical area serviced by each wireless communication system is partitioned into cells, which are further partitioned into sectors. Referring to FIG. 2, there is shown an illustration of a possible partition of a geographical area 60. As shown in FIG. 2, the geographical area 60 is divided into a plurality of cells 60-1, . . . ,n, which are divided into sectors denoted herein as A, B and C. Typically, the radio channels are divided into sub-sets that are assigned to the cells and/or sectors in a manner maximizing signal-to-noise ratio.

Referring back to FIG. 1, each wireless communication system 20,40 includes a plurality of Base Stations 32,52 which are connected to a Mobile Switching Center 22,42. Each cell of the wireless communication system has associated a Base Station for providing wireless communication services to the cell. Each Base Station is preferably centrally located within its respective cell, and includes an antenna 34,54 for each sector of the cell, a time indicator 36,56 for recording the time mobile-telephone transmissions are received by the Base Station, a signal strength detector 38,58 for measuring the signal strengths of received mobile-telephone transmissions, and a receiver/transmitter for receiving and transmitting voice, data, fax, video, etc. from and to the mobile-telephones and the Mobile Switching Center. The configuration of the antenna will depend on the location technique being employed by the wireless communication system, as will be understood by one of ordinary skill in the art. In one embodiment, the time indicators of each Base Station in the wireless communication system are synchronized using well known synchronization techniques, such as the techniques using Global Positioning Satellites (GPS), wherein the accuracy of the synchronization is maintained to nanosecond levels.

Each Mobile Switching Center 22,42 includes a Location sub-System 26,46, a Location Authentication Center 28,48, a Home Location Register 24,44, and a Visitor Location Register 23,43. In one embodiment, the Location sub-System is a combination of hardware and software for determining the location of a mobile-telephone using information typically collected by wireless communication systems. The Location sub-System includes a Query Control 27,47 and a Location Process 25,45. The Query Control is a computer processor (or equivalent) with a software process for interfacing the Location sub-System with the Request System and controlling the flow of data to and from the Request System. The Location Process is a computer processor (or equivalent) with a software process for determining the location of a mobile-telephone using one of the following well-known location techniques: Time Difference Of Arrival (TDOA); Direction Of Arrival (DOA); Ranging; or Satellite Positioning System, such as GPS and GLOSNASS. For purposes of discussion, the present invention will be described herein with respect to the TDOA location technique. It should be apparent to one of ordinary skill in the art, however, that the present invention is equally applicable to other location techniques. Note that for DOA, the Base Stations would have multiple antennas or an antenna capable of receiving a signal from multiple locations or positions.

The Location Authorization Center 28,48 provides security elements to the Location sub-System. Specifically, in one embodiment, the Location Authorization Center is a database containing indications of mobile-telephones, such as mobile-telephone identification numbers (MIN) or mobile-telephone directory numbers (MDN), and security codes, such as passwords. For example, a user desiring to locate a mobile-telephone needs to provide the MIN of the mobile-telephone to be located and a password. If the MIN-password pair provided by the user does not match the MIN-password pair contained in the Location Authorization Center, the user is not authorized and Location sub-System will not locate the mobile-telephone. In another embodiment, the Location Authorization Center is centrally located such that Location sub-Systems in any wireless communication system may access it.

The Home Location Register 24,44 and Visitor Location Register 23,43 are databases containing information typically collected by the wireless communication systems 20,40. Specifically, the Home Location Register includes system level information about home mobile-telephones, i.e., mobile-telephones in their Home System, and the Visitor Location Register includes calling information about roaming mobile-telephones, i.e., mobile-telephones in a Roaming System, served by the wireless communication system in which the Visitor Location Register is a part. Specifically, the Home Location Register includes MINs for home mobile-telephones. If the home mobile-telephones were last served by a Roaming System, the Home Location Register further includes the identity of the Roaming System that last served the corresponding home mobile-telephone. Note that, in one embodiment, the absence of an identity of a Roaming System indicates that the Home System is the last known wireless communication system to serve the home mobile-telephone.

The Visitor Location Register includes MINs for home mobile-telephones and roaming mobile-telephones served by the wireless communication system in which the Visitor Location Register is a part. The Visitor Location Register further includes calling information for home mobile-telephones and roaming mobile-telephones served by the wireless communication system in which the Visitor Location Register is a part, wherein the calling information includes a receive time of a mobile-telephone transmission, cell and sector identifiers specifying the cell and sector receiving the mobile-telephone transmission, a call state specifying the status of the mobile telephone, etc. In one embodiment, call states include idle, conversation, out-of-range, off, etc. When the mobile-telephone is in the conversation call state, the Visitor Location Register further includes voice channel information, which is information corresponding to the specific communication channel being used to transmit voice, data, fax, video, etc. Note that the voice channel information will vary according to the multiplexing technique being employed by the wireless communication system. For example, if the wireless communication system employs Time Division Multiple Access (TDMA), the voice channel information will include a radio channel and a time slot.

Figure 2A:
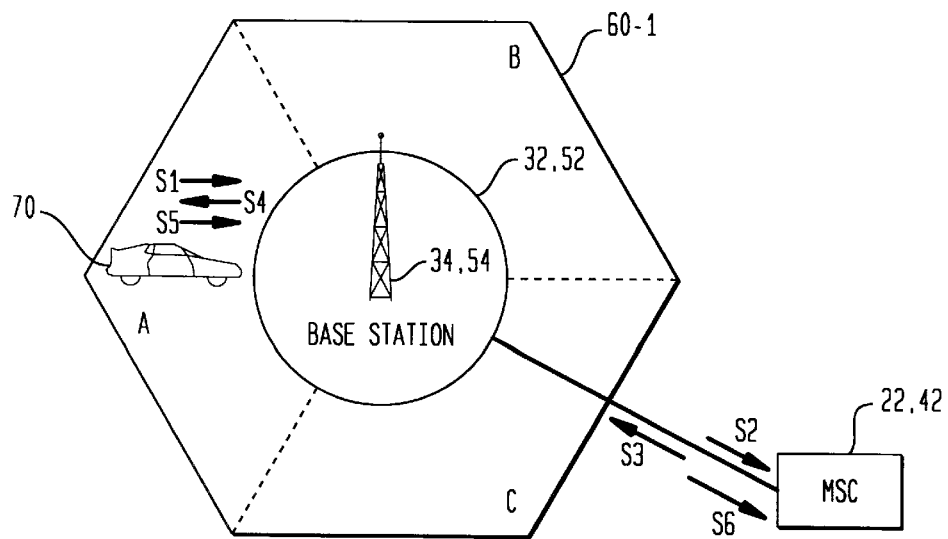
FIG. 2a depicts a detail illustration of cell 60-1 in FIG. 2.

To use the services of a wireless communication system, the mobile-telephone must first register with the wireless communication system. This process of registering is typically performed autonomously. Referring to FIGS. 2 and 2a, suppose a mobile-telephone 80 in sector A of cell 60-1 wants to use the services of the wireless communication system providing coverage to a particular geographical area 60. FIG. 3 shows a flowchart 300 illustrating the manner in which the mobile-telephone 80 would autonomously register with the wireless communication system in accordance with one embodiment of the present invention. As shown in FIGS. 2a and 3, in step 310, the mobile-telephone 70 transmits a signal S1 (or registration signal) containing its MIN to the Base Station in cell 60-1 via a set-up overhead channel. In one embodiment, Base Stations receiving a mobile-telephone transmission time stamps and determines the signal strength of the mobile-telephone transmission. Thus, in step 320, the Base Station serving cell 60-1 receives, time stamps, and determines the signal strength of the first signal. Note that the first signal is also received by other Base Stations in other cells, including the Base Stations in cells 60-2, 60-3, as shown back in FIG. 2. Typically, the signal strength of the first signal received by the Base Station in cell 60-1 would be stronger than the signal strength of the first signal received by any other Base Station because of the proximity of the mobile-telephone 70 with respect to the Base Station in cell 60-1.

In one embodiment, Base Stations receiving any mobile-telephone transmission will transmit to the Mobile Switching Center a signal containing a MIN corresponding to the transmitting mobile-telephone, a receive time of the mobile-telephone transmission, a cell identifier corresponding to that Base Station, a sector identifier corresponding to the sector of the cell receiving the mobile-telephone transmission with the strongest signal strength, a signal strength measurement of the mobile-telephone transmission, and channel information identifying the channel over which the mobile-telephone transmission was received. Thus, in step 330, the Base Station receiving the signal S1 transmits to the Mobile Switching Center a signal S2 containing the MIN, the receive time, cell and sector identifiers, the signal strength measurement, and channel information. This information is subsequently stored by the Mobile Switching Center in its Visitor Location Register. Note that the signal strength measurements of each Base Station are used by the Mobile Switching Center to determine which of the Base Stations receiving the mobile-telephone transmission should be the serving Base Station, which is the Base Station that actually carries the phone call, e.g., transmits voice, data, fax, video, etc., or receives the registration signal having the strongest signal strength measurement. In most cases, the serving Base Station is the Base Station with the strongest signal strength measurement and/or closest to the mobile-telephone.

In step 340, the Mobile Switching Center uses the MIN to determine whether the mobile-telephone 70 is a roaming mobile-telephone or a home mobile-telephone. If the mobile-telephone 70 is a home mobile-telephone, the flowchart continues to step 350 where the Mobile Switching Center uses its Home Location Register to determine whether the mobile-telephone 70 is an authorized mobile-telephone. If the mobile-telephone 70 is a roaming mobile-telephone, the flowchart 300 continues to step 360 where the Mobile Switching Center determines the mobile-telephone's Home System using the MIN and, in step 370, checks with the mobile-telephone's Home System to determine whether the mobile-telephone 70 is an authorized mobile-telephone. Specifically, in step 370, the Mobile Switching Center transmits to the mobile-telephone's Home System an authorization request containing the MIN and a Roaming System identifier indicating the identity of the Roaming System submitting the authorization request. The mobile-telephone's Home System uses its Home Location Register to determine whether the mobile-telephone associated with the MIN in the authorization request is an authorized mobile-telephone. The result of such determination is returned to the Roaming System. Note that the Roaming System identifier is stored in the Home Location Register of the Home System as part of step 370. If the mobile-telephone 70 is an authorized mobile-telephone, then registration is successful. Otherwise registration is unsuccessful and the services of the wireless communication system are denied to the mobile-telephone. In one embodiment, the registration result is transmitted as a signal S3 from the Mobile Switching Center to the serving Base Station where the Base Station re-transmits the signal S3 (as a signal S4) to the mobile-telephone, as shown in FIG. 2a. Note that an attempt by a mobile-telephone to autonomously register, in one embodiment, is deemed to have been served by the wireless communication system in which it attempted to register.

Upon successful registration, the mobile-telephone is ready to initiate or receive phone calls. Whenever the mobile-telephone is engaged initiating or receiving phone calls, the mobile-telephone is in the idle call state. As long as the mobile-telephone remains in the idle call state, the wireless communication system typically requires the mobile-telephone to re-register at predetermined intervals. If the mobile-telephone does not re-register within the predetermined intervals, the wireless communication system can assume the call state of the mobile-telephone has change to "off" or "out-of-range." Re-registration is not typically required if the mobile-telephone is or has recently been in a conversation call state. In one embodiment, a mobile-telephone is in the conversation call state upon successful initiation or reception of a phone call. Initiating a phone call involves a mobile-telephone transmission of a signal S5, as shown in FIG. 2a, via the set-up overhead channel to the Base Station, wherein the signal S5 includes the mobile-telephone's MIN and a destination phone number. The Base Station subsequently transmits a signal S6, which includes the destination phone number, to the Mobile Switching Center where it is used to complete the phone call over the Public Telephone Switching Network. Receiving a phone call involves a Base Station transmission (or signal), i.e., signal transmitted from a Base Station, of an incoming phone call signal, e.g., telephone ring, via the set-up overhead channel to the mobile-telephone. Initiation and reception of a phone call further involve assignment of a voice channel, a time slot and/or a code, thereby specifying the manner in which voice, data, fax, video, etc. are transmitted over the air. As mentioned earlier, this voice channel information is stored in the Visitor Location Register of the wireless communication system serving the mobile-telephone.

Figure 4A:
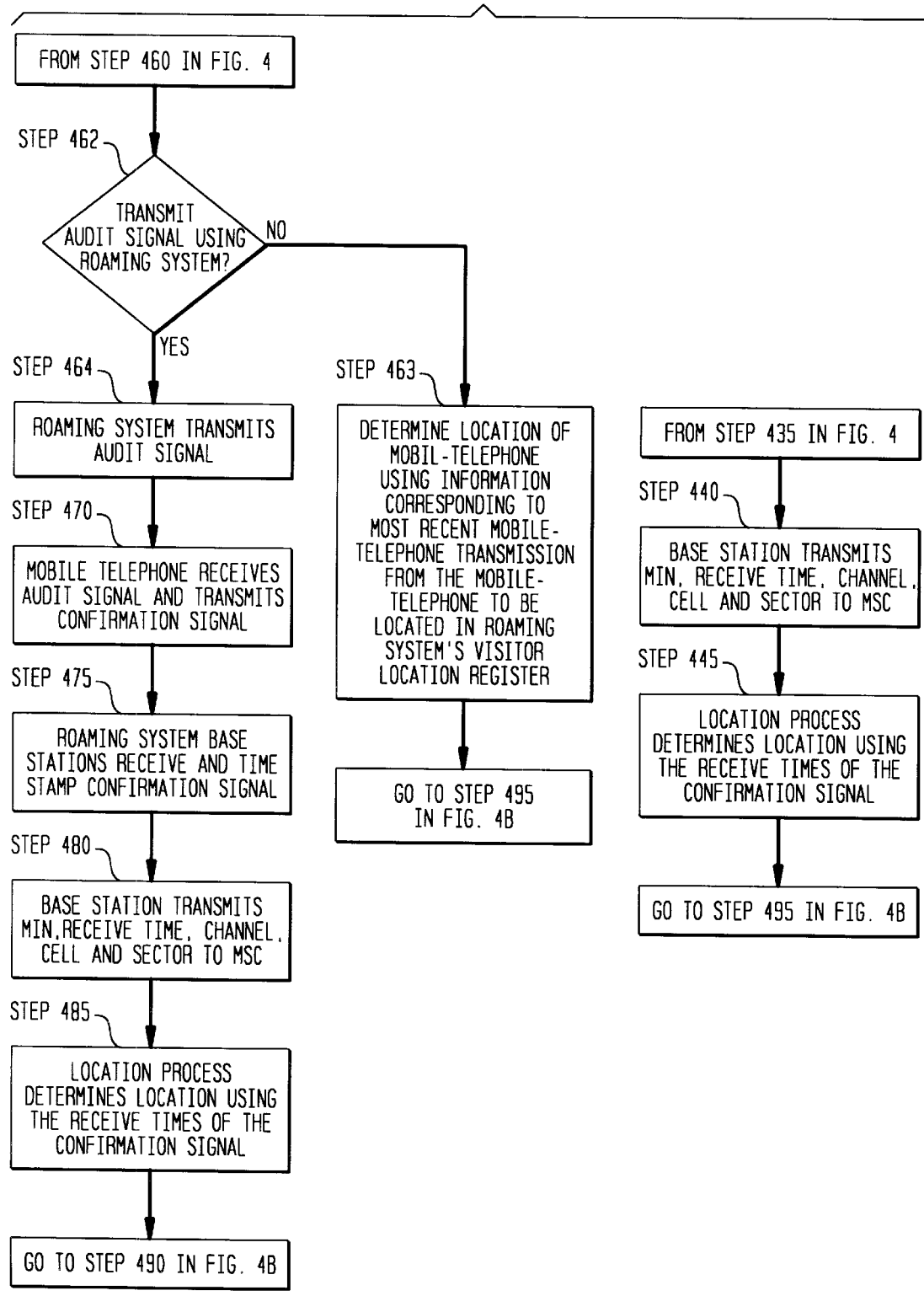
Figure 4B:
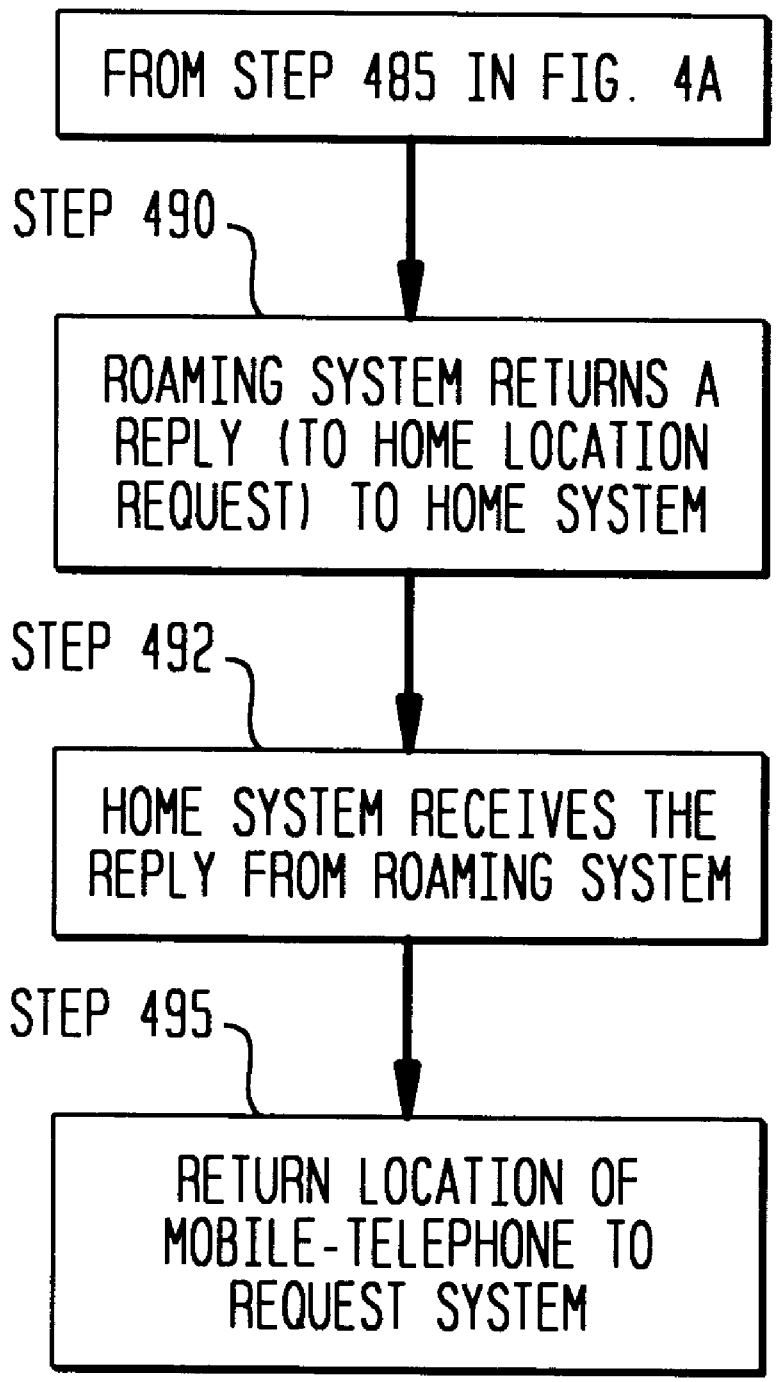

The present invention allows for the location of a mobile-telephone whether the mobile-telephone is in a Home System or a Roaming System. Furthermore, the present invention can locate a mobile-telephone that is idle, engaged in a conversation, or initiating a phone call. Referring to FIGS. 4,4a,4b, there is shown a flowchart 400 illustrating the manner in which one embodiment of the present invention locates a mobile-telephone that is idle or engaged in a conversation. In this embodiment, a user uses the Request System to submit a user location request to the Home System of the mobile-telephone to be located, wherein the user location request is a message containing the MIN of the mobile-telephone to be located, a password and a request identifier that identifies the user location request. In one embodiment, the request identifier indicates the Request System submitting the user location request. Note that the user location request may be set up by the Request System using a database administrative process. In this database administrative process, the Request System accesses a database to determine the identity of the Home System from the MIN. It is also possible to require the user to specify the identity of the Home System. Further note that, in another embodiment, the Request System can submit the user location request directly to the Roaming System that is serving the mobile-telephone to be located if the Request System can determine the identity of the Roaming System. For example, the Request System can determine the identity of the Roaming System by using the contents of the Home Location Register of the Home System or another database that knows the identity of the wireless communication system serving the mobile-telephone to be located.

As shown in FIG. 4, in step 405, the Location sub-System of the Home System receives the user location request and, in step 410, checks the user's profile for a valid password using the Location Authorization Center to determine whether the user location request is authorized, e.g., checks the MIN-password pair in the user location request for a matching MIN-password pair in the Location Authorization Center. If the user location request is not authorized, the Location sub-System returns to the Request System, in step 415, a non-authorization message indicating that the user location request is denied. Otherwise the Location sub-System continues to step 420 where the Location sub-System uses the MIN and/or the Home Location Register to determine whether the mobile-telephone to be located was last served by the Home System or a Roaming System. If the mobile-telephone to be located was last served by the Home System, the flowchart 400 continues to step 422 where the Location sub-System determines whether to cause the Home System to transmit an audit signal, which is a message that includes the MIN of the mobile-telephone to be located and indicates to the mobile-telephone corresponding to the MIN to respond to the audit signal. Specifically, the Location sub-System uses the call state information contained in the Visitor Location Register to determine whether to cause the transmission of the audit signal. If the call state of the mobile-telephone is idle or conversation, then the Location sub-System causes the Home System in step 424 to transmit an audit signal from the serving Base Station via an overhead channel to the mobile-telephone. If the call state of the mobile-telephone is off or out-of-range, then the audit signal is not transmitted and the flowchart 400 continues to step 423 where the Location Process determines the location of the mobile-telephone using the calling information corresponding to the most recent transmission received from the mobile-telephone of interest, which is stored in its Visitor Location Register.

In one embodiment, the overhead channel used to transmit the audit signal depends on the call state of the mobile-telephone. If the mobile-telephone is idle, then the audit signal is transmitted via the set-up overhead channel. If the mobile-telephone is engaged in a conversation, then the audit signal is transmitted via the voice overhead channel associated with the voice channel assigned to the mobile-telephone (when the mobile-telephone is in the conversation call state).

Upon receipt of the audit signal, the mobile-telephone responds in step 430 by transmitting a confirmation signal, which is a signal that can be used to locate the mobile-telephone 70. Note that, in one embodiment, the power level of the confirmation signal may be increase to permit more Base Stations to receive the confirmation signal. In an alternate embodiment of the present invention, the confirmation signal is a signal that includes the MIN of the mobile-telephone to be located and that will enhance the accuracy of the location system. Referring to FIG. 5, there is shown an example of a confirmation signal 80 that will enhance the accuracy of the location system. As shown in FIG. 5, the confirmation signal 80 is a broadband digital signal with a predictable waveform that makes the confirmation signal easier for wireless communication systems to detect, thereby enhancing the accuracy of the mobile-telephone's location. Note that this concept is based on the well-known Kramer-Rao lower bound technique which is used to describe accuracy in positioning systems as a function signal bandwidth. Compare the confirmation signal 80 to the analog signal 72 in FIG. 5. Although the power of the two signals are identical, the bandwidth of the confirmation signal 80 is much greater than the bandwidth of the analog signal 72. The confirmation signal can be transmitted from the mobile-telephone to the Base Station via a set-up overhead channel, a voice overhead channel, or a voice channel. In one embodiment, the confirmation signal is transmitted via the overhead channel that was used to transmit the audit signal.

In another embodiment of the present invention, the confirmation signal is a broadband digital signal having a known or predetermined code with a bit rate of X bits per second. In this embodiment, the base stations include a correlator or matched filter to determine the time of arrival within a bit time period, thereby providing improved accuracy over narrowband confirmation signals. The known or predetermined code is easier to detect because of the improved error tolerance of a receiver using the correlator or matched filter. Note that in this embodiment, the audit signal may include the code to be transmitted in the confirmation signal, or the confirmation signal may include a standard code.

In step 435, the confirmation signal is received and time stamped by Base Stations in the serving and neighboring cells, such as cells 60-1,60-2,60-3. In step 440, the MIN, receive times, channel information, and cell and sector identifiers are subsequently transmitted by the Base Stations to the Mobile Switching Center where the information is stored in the Home System's Visitor Location Register. In step 445, the Location sub-System uses the information received and collected in steps 435–440 by certain Base Stations to determine the location of the mobile-telephone. For example, in TDOA, the receive times of the confirmation signal collected by the Base Stations that form a triangle about the mobile-telephone are used to determine the location of the mobile-telephone—e.g., Base Stations 60-1,60-2,60-3. This technique is commonly referred to as triangulation. In one embodiment, the location of the mobile-telephone is expressed using a latitude, a longitude, an accuracy assessment in terms of radial error or multidimensional error, and a speed and heading of the mobile-telephone using multiple location determinations. Upon determining the location of the mobile-telephone, the flowchart 400 continues to step 495 where the location of the mobile-telephone is returned to the Request System.

Referring back to FIG. 4, if the mobile-telephone is a roaming mobile-telephone, the flowchart goes from step 420 to step 450 where the Location sub-System uses the Home Location Register to determine the identity of the Roaming System. Upon such determination, the Location sub-System of the Home System sends a home location request via the Public Telephone Switching Network to the serving Roaming System, in step 455, wherein the home location request is a message containing the request identifier, the MIN, and a Home System identifier. In one embodiment, the home location request further contains an authorization code indicating that the original user location request is authorized. The Location sub-System of the Roaming System, in step 460, receives the home location request and, in steps 462–485, processes the home location request in substantially the same manner as the Location sub-System of the Home System in steps 422–445. In step 490, a reply to the home location request is returned by the Roaming System to the Home System via the Public Telephone Switching Network, wherein the reply contains the location of the mobile-telephone and the request identifier. In step 692, the Location sub-System of the Home System receives the reply and, in step 495, returns the mobile-telephone's location to the Request System.

As mentioned earlier, the present invention can determine the location of a mobile-telephone when the mobile-telephone initiates a phone call. In one, the Location sub-System monitors the set-up overhead channels and determines whether a particular mobile-telephone is to be located using the information transmitted via the set-up overhead channel. For example, the Location sub-System may locate all mobile-telephones initiating emergency 911 phone calls or another predetermined phone number. Or the Location sub-System may locate mobile-telephones initiating emergency 911 phone calls if the mobile-telephone has associated a predetermined MIN, sequence of characters, or other identifier. Upon determination of the mobile-telephone's location, the Location sub-System reports the results to the appropriate agency or user.

In one embodiment, mobile-telephone users may used the Location sub-System to determine request their location. In this embodiment, the mobile-telephone user transmits a location code via the set-up channel that will indicate to the Location sub-system (or wireless communication system) to determine the location of the transmitting mobile-telephone—that is, the Location sub-System monitoring the set-up channel will automatically know to determine the location of the mobile-telephone transmitting the location code. Upon determination of the mobile-telephone user's location, the location information can be transmitted to the mobile-telephone user via a voice channel by an operator or automated voice system, or via an overhead channel as a text message to be readable from a display on the mobile-telephone.

Although the present invention has been described in considerable detail with reference to certain embodiments, other versions are possible. Therefore, the spirit and scope of the present invention should not be limited to the description of the embodiments contained herein.

We claim:

1. A wireless location system for locating a mobile-telephone comprising:

a plurality of base stations associated with cells, each of the base stations having a transmitter for transmitting an audit signal that indicates to a particular mobile-telephone to respond with a confirmation signal, a receiver for receiving the confirmation signal transmitted from the mobile-telephone, and a time indicator for recording a receive time of the confirmation signal; and a location system that determines a location of the mobile-telephone using the receive times of the confirmation signal at one or more of the plurality of base stations, the location system being operable to cause a base station to transmit the audit signal via a voice overhead channel or a voice channel if the mobile-telephone is in a conversation call state.

2. The system of claim 1, wherein the location system is operable to cause a base station nearest to the mobile-telephone to transmit the audit signal.

3. The system of claim 1, wherein the location system uses the receive times of the confirmation signal at the plurality of base stations nearest the mobile-telephone to determine the location of the mobile-telephone.

4. The system of claim 1, wherein the location system is operable to cause a base station to transmit the audit signal via a set-up overhead channel if the mobile-telephone is in an idle call state.

5. The system of claim 1, wherein the time indicators of each base stations are time synchronized with respect to the time indicators of each of the other base stations.

6. The system of claim 5, wherein the time indicators are time synchronized to within nanosecond levels of the time indicators of each of the other base stations.

7. The system of claim 1, wherein the location system determines the location of the mobile-telephone using a difference in receive times of the confirmation signal at one or more of the plurality of base stations.

8. The system of claim 1, wherein the location system determines the location of the mobile-telephone using a direction of arrival and the receive times for the confirmation signal at one or more of the plurality of base stations.

9. The system of claim 1, wherein the time indicator records a transmission time of the audit signal.

10. The system of claim 9, wherein the location system determines the location of the mobile-telephone using the transmission time of the audit signal.

11. A system for locating a mobile-telephone comprising:
a first wireless communication system having
a first database containing receive times of at least one signal transmitted by a mobile-telephone signals and received by a plurality of base stations in the first wireless communication system, and last known server information indicating an identity of a wireless communication system last known to serve the mobile-telephone, and
a first location system that determines a location of the mobile-telephone using the receive times in the first database if the last known server information indicates the first wireless communication system, wherein the first location system determines the location of the mobile telephone using a second database belonging to a second wireless communication system if the last known server information indicates the second wireless communication system, the second database containing receive times of at least one signal transmitted by the mobile-telephone and received by a plurality of base stations in the second wireless communication system.

12. The system of claim 11 further comprising:
a second wireless communication system having a second database containing receive times of at least one signal transmitted by the mobile-telephone signals and received by a plurality of base stations in the second wireless communication system, the first location system using the receive times in the second database if the last known server information indicates the second wireless communication system.

13. The system of claim 11 further comprising:
a second wireless communication system having a second database and a second location system, the second database containing receive times of at least one signal transmitted by the mobile-telephone signals and received by a plurality of base stations in the second wireless communication system, the second location system determining the location of the mobile-telephone using the receive times in the second database if the last known server information indicates the second wireless communication system.

14. The system of claim 11 further comprising:
a request system for permitting a user to submit a user location request to the first wireless communication system, the user location request containing information identifying the mobile-telephone.

15. The system of claim 11 further comprising:
a location authorization center for determining whether a user location request is authorized.

16. The system of claim 1, wherein the receiver receives at least one other signal transmitted by the mobile-telephone, and the location system determines the location of the mobile-telephone if the other signals contains a predetermined code.

17. The system of claim 1, wherein the receiver receives at least one other signal transmitted by the mobile-telephone, the time indicator records receive times of the other signals, and the location system determines the location of the mobile-telephone using the receive times of the other signal at one or more of the plurality of base stations.

18. The system of claim 17, wherein the location system determines the location of the mobile-telephone if the other signal contains a predetermined code.

19. A wireless location system for locating a mobile-telephone comprising:

a plurality of base stations associated with cells, each of the base stations having a transmitter for transmitting an audit signal that indicates to a particular mobile-telephone to respond with a confirmation signal, a receiver for receiving the confirmation signal transmitted from the mobile-telephone, and a time indicator for recording a receive time of the confirmation signal; and
a location system that determines a location of the mobile-telephone using the receive times of the confirmation signal at one or more of the plurality of base stations, wherein the location system transmits the location of the mobile-telephone to the mobile-telephone.

20. The system of claim 1 further comprising:
a database that contains the receive times of at least one signal transmitted by the mobile-telephone and received by one or more of the plurality of base stations, the location system determining the location of the mobile-telephone using the receive times in the database.

21. A wireless location system for locating a mobile-telephone comprising:
a plurality of base stations associated with cells, each of the base stations having a transmitter for transmitting an audit signal that indicates to a particular mobile-telephone to respond with a confirmation signal, a receiver for receiving the confirmation signal transmitted from the mobile-telephone, and a time indicator for recording a receive time of the confirmation signal; and
a location system that determines a location of the mobile-telephone using the receive times of the confirmation signal at one or more of the plurality of base stations, wherein the location system determines the location of the mobile-telephone using the receive times in the database if the mobile-telephone is not transmitting any signal to at least one of the plurality of base stations.

22. The system of claim 1 further comprising:
a location authorization center for determining whether the location system is authorized to locate the mobile-telephone.

23. A method for locating a mobile-telephone in a wireless communication system comprising the steps of:
transmitting when the mobile-telephone is in a conversation call state over a voice overhead channel or a voice channel an audit signal that indicates to a particular mobile-telephone to respond by transmitting a confirmation signal;
receiving the confirmation signal at a plurality of base stations;
recording receive times when the confirmation signal arrives at the plurality of base stations; and
determining a location of the mobile-telephone using the receive times of the confirmation signal at the plurality of base stations.

24. The method of claim 23, wherein the audit signal is transmitted via a set-up overhead channel when the mobile-telephone is in an idle call state.

25. A method for locating a mobile-telephone comprising the steps of:
determining whether a particular mobile-telephone was last served by a first wireless communication system using a first database; and locating the mobile-telephone using receive times of a signal transmitted by the mobile-telephone and received by a plurality of base stations in the first wireless communication if the mobile-telephone was determined to be last served by the first wireless communication system.

26. The method of claim 25 comprising the additional step of:

receiving a location of the mobile-telephone from a second wireless communication system if the mobile-telephone was determined to be last served by the second wireless communication system.

27. A system for locating a mobile-telephone comprising:

a database containing information identifying a wireless communication system last known to serve a particular mobile-telephone; and a request system for submitting a location request to the wireless communication system identified in the database as being last known to serve the mobile-telephone.

28. The system of claim 27 further comprising:

a location authorization center for determining whether the location request is authorized.

* * * * *